US010757223B2

(12) United States Patent
Hjerrild et al.

(10) Patent No.: US 10,757,223 B2
(45) Date of Patent: Aug. 25, 2020

(54) ALTERNATIVE SERVICE PATHWAY FOR SERVICE APPLICATION

(71) Applicant: Uber Technologies, Inc., San Francisco, CA (US)

(72) Inventors: Benjamin Andrew Hjerrild, San Francisco, CA (US); Naveen Pilanku Narayanan, Daly City, CA (US); Bruce McLaren Stanley, Jr., San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 70 days.

(21) Appl. No.: 16/130,605

(22) Filed: Sep. 13, 2018

(65) Prior Publication Data

US 2019/0082034 A1 Mar. 14, 2019

Related U.S. Application Data

(60) Provisional application No. 62/558,343, filed on Sep. 13, 2017.

(51) Int. Cl.
*H04L 29/06* (2006.01)
*H04L 29/08* (2006.01)
*H04L 29/14* (2006.01)

(52) U.S. Cl.
CPC .............. *H04L 67/40* (2013.01); *H04L 67/02* (2013.01); *H04L 67/16* (2013.01); *H04L 67/32* (2013.01); *H04L 67/34* (2013.01); *H04L 69/40* (2013.01); *H04L 67/10* (2013.01);
(Continued)

(58) Field of Classification Search
CPC ....... H04L 43/045; H04L 67/40; H04L 67/16; H04L 67/32; H04L 67/02; H04L 67/34; H04L 67/1002; H04L 67/1034; H04L 67/1095; H04L 67/10; H04L 69/40; G06F 8/70; G06F 21/51; G06F 21/6254
See application file for complete search history.

(56) References Cited

U.S. PATENT DOCUMENTS

| 9,128,899 B1 | 9/2015 | McAlister |
| 2006/0236150 A1 | 10/2006 | Lintz et al. |
| 2009/0013317 A1 | 1/2009 | Abfalter et al. |

(Continued)

OTHER PUBLICATIONS

PCT International Search Report and Written Opinion, PCT Application No. PCT/IB2018/057031, dated Feb. 18, 2019, ten pages.

*Primary Examiner* — Jungwon Chang
(74) *Attorney, Agent, or Firm* — Fenwick & West LLP

(57) ABSTRACT

A processor of a client device attempts to load a service using a first application that is pre-configured to communicate with a provider of the service during an initial loading of the first application. The processor determines that the first application has failed to load the service and responsively re-attempts to load the service using the first application. In response to determining that the first application has again failed to load the service during the re-attempt, the processor launches a second application that is not pre-configured to communicate with the provider during an initial loading of the second application. The processor retrieves, using the second application, from the provider, parameters for loading the service, and loads the service, using the second application, based on the parameters.

20 Claims, 4 Drawing Sheets

(52) U.S. Cl.
CPC ...... *H04L 67/1002* (2013.01); *H04L 67/1034* (2013.01); *H04L 67/1095* (2013.01)

(56) References Cited

U.S. PATENT DOCUMENTS

| | | |
|---|---|---|
| 2010/0223498 A1 | 9/2010 | Schlesinger et al. |
| 2015/0205949 A1* | 7/2015 | Iskin .................. G06F 21/51 |
| | | 713/187 |
| 2016/0357451 A1 | 12/2016 | Chen et al. |
| 2018/0074941 A1* | 3/2018 | Tokie ................. H04L 43/045 |
| 2018/0275986 A1* | 9/2018 | Ghosh .................... G06F 8/70 |
| 2018/0373885 A1* | 12/2018 | Arad ................ G06F 21/6254 |

* cited by examiner

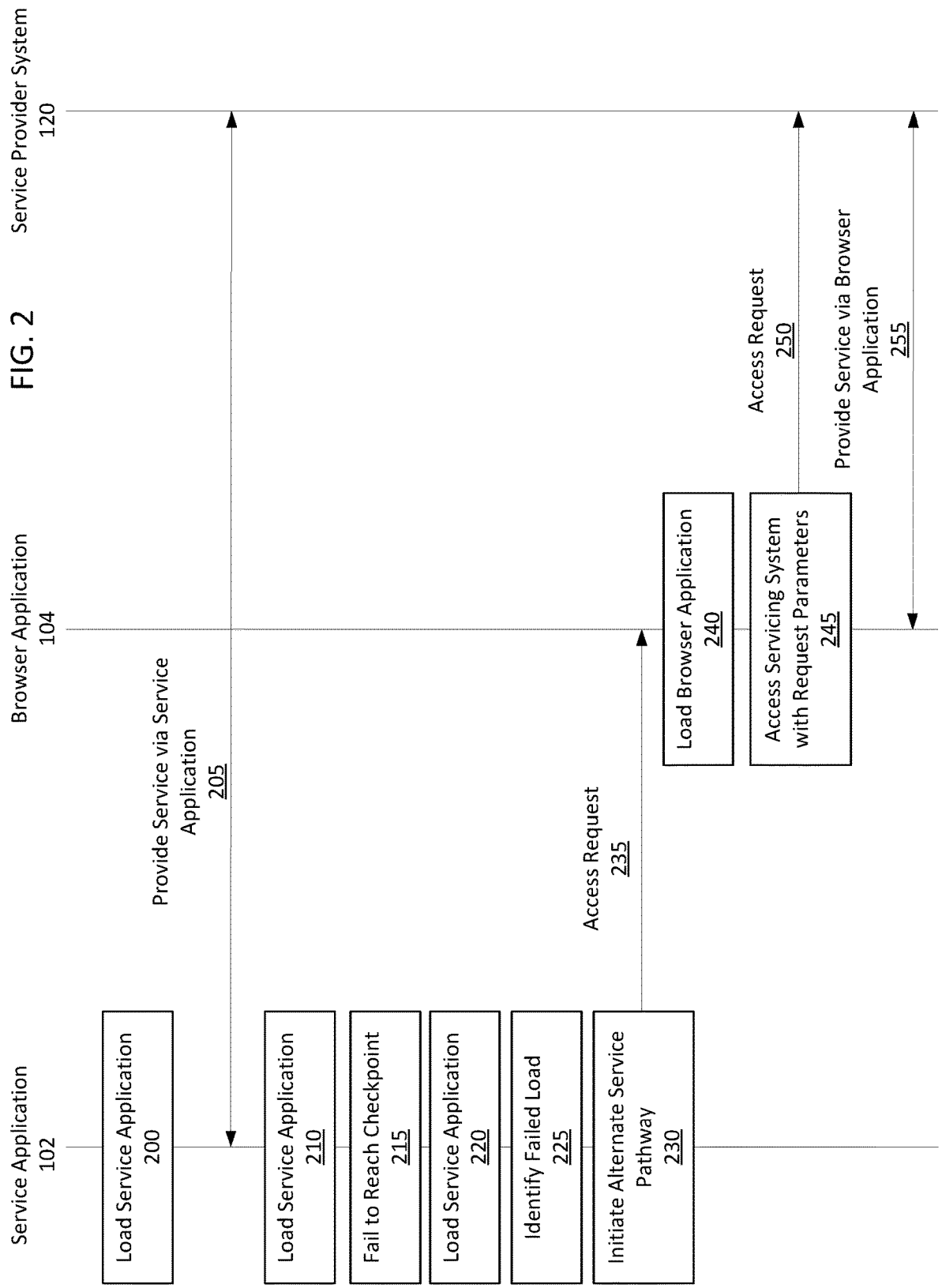

302 Attempt to load a first application for execution on a client device, the first application being pre-configured to communicate with a provider for providing a service to a user of the client device

304 Did the first application fail to load? — NO → END

YES

306 Re-attempt to load the first application

308 Did the first application again fail to load the service during the re-attempt? — NO → END

YES

310 Load a second application with a reference to the provider to provide the service, the reference being supplied by the first application to the second application, the second application not being pre-configured to provide the service

312 Retrieve, using the second application, from the provider, parameters for providing the service

314 Provide the service, using the second application, based on the parameters

ALTERNATIVE SERVICE PATHWAY FOR SERVICE APPLICATION

CROSS-REFERENCE TO RELATED APPLICATIONS

The instant application claims the benefit of U.S. Provisional Patent Application No. 62/558,343, filed Sep. 13, 2017, the disclosure of which is hereby incorporated by reference herein in its entirety.

BACKGROUND

This description relates generally to providing services related to a computer network application, and particularly to providing those services when the application fails to properly load or experiences an error.

Client devices and their installed applications provide various functions to a user through execution of the installed applications. In some cases, a service application typically communicates with a service provider system to provide services to the user of the client device. This service application may be specialized for the service and may be provided, for example, by the service provider. The service application may include logic and other features for providing the service to the user. In some instances, the service application may fail to function properly, including preventing load or boot of portions of the service application, which can prevent the service from being provided to the user of the device. This can be especially problematic when the service coordinates some real-life activity for a user, such as event planning, mapping or routing, or coordinating travel. Users may also be unable to readily determine the cause or correction for the failing service application. In some client devices, the service application may also be unable to automatically correct or update its code in response to an error.

SUMMARY

A service application includes an auxiliary pathway for providing the service to a client via a browser application on the client device. When the service application operates normally, it may provide services in conjunction with the service provider system. When the service application loads, it monitors whether it successfully reaches one or more checkpoints in the loading process. When the service application does not successfully load or execute, the service application provides a request to the browser application to contact the service provider system for the user to receive services through the browser application rather than through the service application.

To initiate the service through the browser application, when the service application identifies that it has failed to load on prior attempts, the service application sends an access request to the browser application, providing an address and optionally request parameters for the browser application to access the service provider system. The request parameters may describe characteristics of the service application and device, so that the service provider system may tailor its interface and communications to the device to mimic the appearance of the service provider application. In addition, the service provider system may provide instructions to the user or a message for the browser application to return to the service application to correct the behavior of the service application. This permits the user of the device to continue to receive the service when initially interacting with the service application despite the service application failing to load or properly execute.

In some aspects of the disclosure, a processor of a client device attempts to load a first application that is pre-configured to communicate with a provider for providing a service to a user of the client device. For example, the processor attempts to load a ride share application, which is pre-configured to communicate with a ride share backend to obtain data for providing a ride share service. The processor may determine that the first application has failed to load during the attempt.

The processor may determine that the first application has failed to load the application during the attempt by retrieving a plurality of checkpoints corresponding to the service (e.g., from the provider of the service), and determining whether the first application reached each checkpoint of the plurality of checkpoints during the attempt. In response to determining that the first application did not reach each checkpoint of the plurality of checkpoints during the attempt, the processor may determine that the first application has failed to load.

In response to determining that the first application has failed to load, the processor may re-attempt to load the first application. In some embodiments, when attempting to load the first application, the process may have attempted to load a plurality of modules of the first application. When re-attempting to load the first application, the processor may iteratively re-load the first application with, at each iteration, an additional module of the plurality of modules disabled. The processor may determine, at each iteration, whether the re-launching has been performed a threshold number of times, and, in response to determining that the re-launching has been performed the threshold number of times, the processor may determine that the first application has again failed to load during the re-attempt.

In response to determining that the first application has again failed to load the service during the re-attempt, the processor may load a second application with a reference to the provider to provide the service, the reference being supplied by the first application to the second application, the second application not being pre-configured to provide the service. For example, the second application may be a generic browser application, and the reference may be an address (e.g., a uniform resource locator (URL)) that the first application provides to the browser application to contact the provider in order to provide the service.

The processor may load the service, using the second application, based on the parameters by generating for display a user interface by the second application that is identical to a user interface typically provided by the first application. The processor may further receive input from a user by way of the user interface, retrieve, using the second application, additional information from the provider, and alter a visual component of the user interface based on the additional information.

The features and advantages described in this summary and the following detailed description are not all-inclusive. Many additional features and advantages will be apparent to one of ordinary skill in the art in view of the drawings, specification, and claims hereof.

BRIEF DESCRIPTION OF DRAWINGS

FIG. 2 illustrates a timing diagram for providing an alternate pathway for providing the service to the user, in accordance with some embodiments.

FIG. 3 is a flow chart of a process for loading a service using a second application when attempts to load the service using a first application have failed, in accordance with some embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
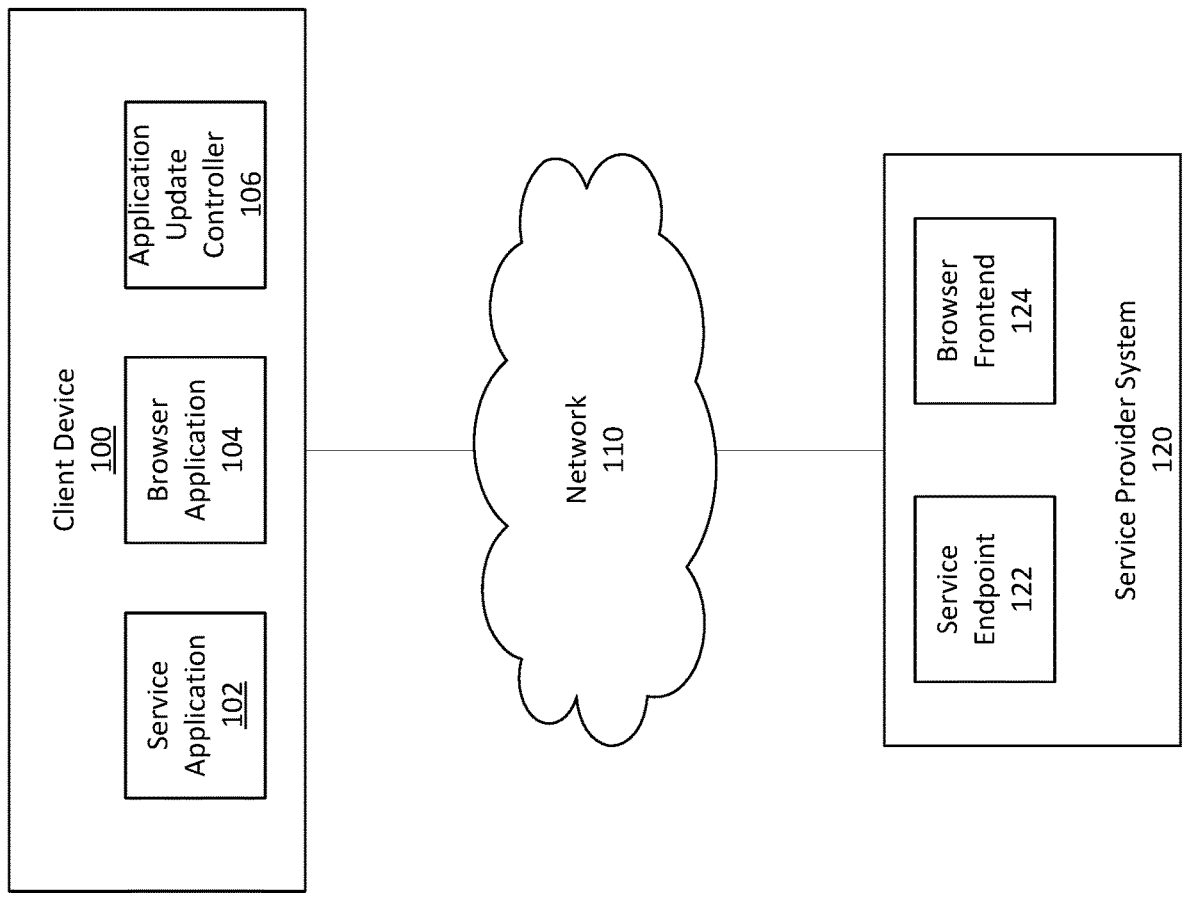
FIG. 1 is a high-level block diagram of a system environment for a client device providing a service in conjunction with a service provider system, in accordance with some embodiments.

FIG. 1 is a high-level block diagram of a system environment for a client device 100 providing a service in conjunction with a service provider system 120, in accordance with some embodiments. FIG. 1 includes a client device 100, a network 110, and a service provider system 120. Alternate embodiments of the system environment can have any number of user devices 100, as well as multiple service provider systems 120. The particular functions performed by the various entities of FIG. 1 may vary in different embodiments.

The client device 100 provides a service to a user of the client device 100 in conjunction with the service provider system 120. The service is typically provided by a service application 102 which communicates with the service provider system 120, which provides information and other instructions to the service application 102 in providing the service. As one example, the service provided to the user may provide various physical and relational services, such as mapping, routing, or travel coordination to the user. For many users, receiving this service may be essential to completing a real world task, such as navigating a city. As the service is provided by the client device 100, the client device communicates with the service provider system 120 via a network 110. The client device 100 may be various computing devices, such as a mobile device, tablet computer, or laptop.

To interact with and receive the service, the user of the device typically interacts with the service application 102. The service application 102 is an application that may execute on the client device 100 and is typically specialized and specially-programmed to provide the service to the user. For example, the service application may include presentation and user interface logic particular to the service, and may also include business logic and other programming logic for providing the service. Accordingly, and as one example, the service application 102 may communicate directly with a service endpoint 122 at the service provider system 120. The service endpoint 122 may provide an interface for the service application to request information related to the service. For example, the service endpoint 122 may be implemented as an application programming interface (API) or other service that receives and services particular requests for the service. As examples for a transportation service, the service endpoint may receive requests for transportation from the service application 102, and provide information to the service application 102 of mapping data, available providers for transportation, expected cost of transportation, and so forth for display to the user of the client device 100.

The service application 102 may include various configurations and software modules. For example, the service application 102 installed on a particular client device may include one or more additional software modules or variations relative to other installations of the service application 102. These configurations, as well as other modifications to the service application 102, may cause the service application to fail to properly execute or load.

To address the risk that the service application 102 fails to load, the service application 102 includes one or more checkpoints in its loading process. The checkpoints may be pre-configured, or may be retrieved from service provider system 120 (e.g., at arbitrary times, periodically, during a load attempt, or during some other operation of the application). The checkpoints are used to verify that software modules of the service application 102 successfully load to a normal operating state of the service application 102. When the user of the client device 100 initiates the service application 102, the service application 102 loads components of the service application and indicates a checkpoint was reached when the components successfully load. When the service application is initially started, the service application 102 may set flags or other representations of the checkpoints to indicate that the load process has begun and that the checkpoints have not been reached. When a checkpoint is reached, the flag for the checkpoint is designated as having successfully loaded, and when all checkpoints have been reached, the indication that the load process began may be turned off (or the successful load may otherwise be indicated). In this way, if the service application 102 fails to successfully load, the checkpoints may be used on one or more subsequent attempts to load the service application in order to make a final determination that the service application 102 has failed to load.

When the service application fails to load, the service application 102 may perform a set of steps in an attempt to recover functionality of the service application and provide the service to the user. As the number of times that the service application fails to load increases, the service application loading process may perform additional steps, although any number and variation of recovery steps for the service application 102 may be used. As one example, the service application may initially reset or delete local data on the client device 100 related to the service application 102. As a subsequent step, the service application 102 may revert any software modules or configurations to a default state. In general, when performing these attempted recovery steps, the service application 102 may load as few modules and services as possible to increase the likelihood the service application successfully performs the recovery step (and does not again fail to load).

On some client devices 102, the service application 102 may be limited in its ability to automatically update or modify its code or application. Typically the service application 102 includes compiled code for execution on the client device 102. The client device 100 may include an application update controller 106, which prevents applications on the client device from performing modifications to the code. While the application update controller 106 may often be used to prevent malicious applications from changing behavior after installation on the client device 100, it may also prevent the service application 102 from automatically performing an update to the service application 102 and modifying executing code of the service application 102.

In some cases, these other steps may fail to successfully recover the service application 102. When the service application fails to load a threshold number of times (e.g., as one of the recovery steps), the service application 102 may use an alternate pathway to permit the user to still receive the service by providing a request to the browser application 104. The browser application 104 is an application for accessing and interacting with resources through the network, and is typically not programmed specifically for providing the service. Accordingly, typical browser applications 104 include applications that process mark-up language or scripting code to retrieve, process and display resources and display an interface to the user. When the service application 102 fails to load, it provides an access request to the browser application 104 designating an address or location of a resource for the browser application 104 to retrieve and load. The request from the service application 102 may provide a uniform resource locator (URL) to the browser application 104 and specify a set of parameters in or with the access request. As an example, the uniform resource locator may specify a hypertext transfer protocol request to access "m.serviceprovider.com/failedserviceapplication" to the browser application 104.

The access request may specify the resource location for browser frontend 124 at the service provider system 120. Since the service application 102 has failed, and the browser application 104 is not specifically programmed for the service, the browser frontend 124 may provide display and programming logic to the browser application 104 for providing the service to the user. The browser frontend 124 may thus provide mark-up and scripting resources to the browser application 104 providing an interface and other interactions to a user for providing the service. The browser application 104 may then make additional requests with the service endpoint 122 to fulfill required requests of the service. Alternatively, the browser application 104 may interact with the browser frontend 124 for servicing the requests, and requests for the service may be made by the browser frontend 124 to the service endpoint 122.

The parameters included in the access request from the browser application 104 may also specify parameters and characteristics of the client device 100 and the installed service application 102. As example parameters, these may specify the version of the service application, configurations and software packages of the application, an identifier of the device or a user associated with the service application, or a geographic location of the device. These parameters may be based on the request sent from the service application 102 to the browser application 104 or the access request sent from browser application 104 to service provider system 120. Based on the parameters, the service provider system 120 may record data for client devices 100 which are failing to load and may use this alternate service pathway to determine whether there is a more general problem with the installed version of the service application 102 and its configuration. In addition, the parameters may be used for authentication and verification of the client device 100 and of one or more additional client devices 100.

In addition, the parameters may be used to configure the display instructions (e.g., the mark-up language resource or applicable script) that are provided to the browser application 104 to simulate the interface that would be provided by the service application 102. For example, a particular service application 102 may display various user interface components in a particular arrangement or interface, and the display provided to the user by the browser application 104 may mimic this interface, such that the user may not notice that the browser application 104 is actually the application providing the interface, rather than the service application 102. In this way, a user may interact with an icon or other interface element to begin execution of the service application 102. When that service application 102 fails to correctly load and executes the alternative pathway via the browser application 104, the browser application 104 may then display a user interface that is similar to or a replica of the interface the user expected when interacting with the service application 102, providing a seamless transition to the user despite the user now receiving the service through a different application on the client device 100.

The service provider system 120 may also provide instructions to the user through the display of the browser application 104. For example, the service provider system 120 may instruct the user to retrieve and install an update to the service application 102 through the interface provided by the browser application 104.

As the service provider system 120 receives requests from various client devices 100 using the alternative pathway (i.e., the request for service originated with the user interacting with the service application 102, rather than the user requesting access to the service provider 120 directly through interaction with the browser application 140), the service provider system 120 may record this data to determine which configurations and versions of the service application 102 are failing to load. Administrators of the service provider system 120 may then use this data to determine which configurations of the service application to prioritize and fix.

In some configurations, the service application 102 may also include dynamic logic for its execution that may vary without modification to the installed service application. The browser frontend 124 may also send instructions to the browser application 104 for delivery to the service application 102. These instructions may instruct the service application 102 to modify a configuration of the service application 102, and may include modified dynamic logic for the service application 102 that may permit the service application 102 to successfully load. For example, the dynamic instructions may be implemented as JavaScript files used by the Service application 102, and the instructions from the service provider system 120 may be used by the browser application 104 to modify these files at the service application 102. In addition or as an alternative, the instructions from the browser frontend 124 may also instruct the service application 102 to re-start its sequence of recovery steps. In some configurations, because the service application 102 has failed, it may avoid attempting to load modules that will continue to cause the application to fail. By providing an instruction via the browser application 104, the service application 102 may use this instruction as a signal to re-try loading the modules, for example after the service provider system provided a modification to the dynamic logic of the service application.

FIG. 2 illustrates a timing diagram for providing an alternate pathway for providing the service to the user. Initially, the user may interact with the service application 102 to load the service application 200, and the service application 102 interacts with the service provider system 120 to provide the service to the user 205. This service in some examples is provided by the service application 102 interacting with a service endpoint 122.

In another instance, the service application may be loaded 210 and fail to successfully load modules or other components of the service application 102, causing the service application 102 to fail to reach a checkpoint 215. When the service application fails, the service application may attempt to be loaded again 220, at which point the service application identifies that the prior attempt to load the application failed and did not reach the checkpoint 225. In some embodiments, there may be a threshold number of service application load attempts prior to the system identifying a failed load 225. The service application may then perform a set of recovery actions, which may include initiating service via an alternate pathway 230 using the browser application 104. To use the browser application 104, the service application provides an access request 235 to the browser application 104, which may include various parameters as discussed above. The browser application 104 receives the request and is loaded 240. The browser application 104 then accesses the service provider system 245 by following the address or location specified by the access request, and sends the access request 250 to the service provider system 120. The service provider system may then provide the service to via the browser application 255.

As discussed above, the service provider may also use the parameters of the access request to customize the display of the browser application and to restore functionality of the service application 102 by modifying the service application 102 or providing instructions to the user for doing so.

In these ways, the user may continue to receive the service from the service provider system 120, and the service provider system 120 may use the interactions of the browser application 104 with the browser frontend 124 to provide the service and provide instructions to the user or service application 102 to restore functionality of the service application 102.

FIG. 3 is a flow chart of a process for loading a service using a second application when attempts to load the service using a first application have failed, in accordance with some embodiments.

This process 300 begins when a processor of a client device (e.g., processor 402) attempts 302 to load a first application for execution on a client device, the first application being pre-configured to communicate with a provider for providing a service to a user of the client device. For example, processor 402 of client device 100 may attempt to load service application 102, which is pre-configured to communicate with and retrieve data from service provider system 120 (e.g., by way of service endpoint 122) (e.g., during the loading process or during an attempt to provide the service).

After attempting to load the first application, the processor determines 304 whether the first application failed to load during the attempt. For example, the processor may execute a module of the first application that determines whether the first application failed to load (e.g., using checkpoints, as described above). If the processor determines that the first application has successfully loaded, process 300 ends. If, however, the processor determines that the first application has not successfully loaded, the processor optionally re-attempts 306 to load the service using the first application (e.g., by re-launching service application 102). The processor then determines 308 whether the first application again failed to load the service during the re-attempt. If the processor determines that the first application has successfully loaded during the re-attempt, process 300 ends. If, however, the processor determines that the first application has again failed to load during the re-attempt (or if no re-attempt is made), process 300 continues.

As process 300 continues, the processor loads 310 a second application with a reference to the provider (e.g., an address of the provider) to provide the service, the reference being supplied by the first application to the second application, the second application not being pre-configured to provide the service. For example, processor 402 of client device 100 launches browser application 104, which is not pre-configured with a reference for communicating with the provider (e.g., service provider system 120). The processor may be caused to load the second application based on receiving or detecting an instruction from the first application to load the second application for the purpose of providing the service. The processor then retrieves 312, using the second application, from the provider, parameters for providing the service, e.g., by communicating with the provider using the reference (e.g., address). For example, processor 402 of client device 100 uses browser application 104 to retrieve, from browser frontend 124, over network 110, parameters for providing the service. Finally, the processor provides 314 the service, using the second application, based on the parameters. For example, the processor loads a user interface that mimics the normal visual output of service application 102 using browser application 104 based on the parameters.

Figure 4:
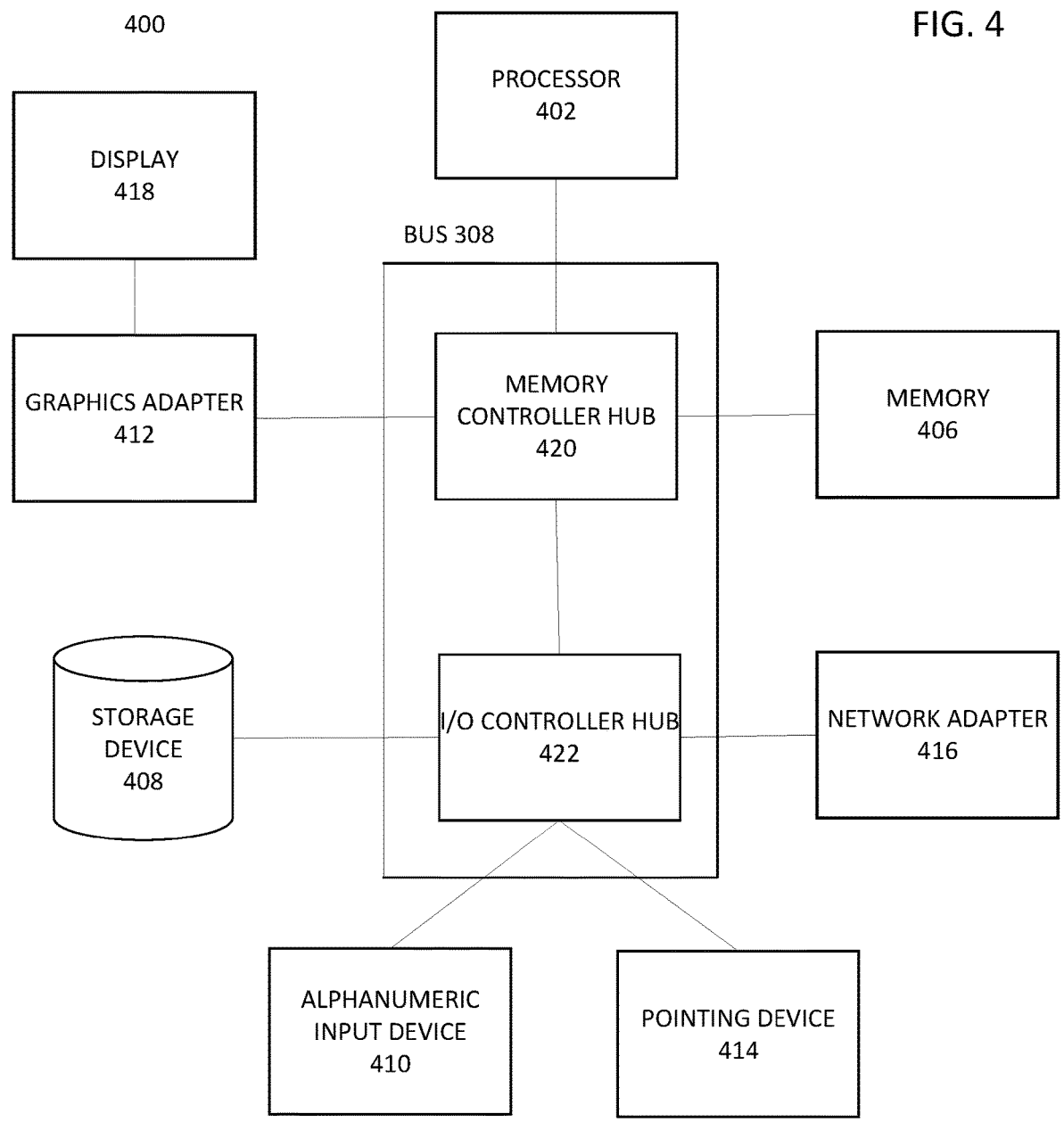
FIG. 4 is a block diagram illustrating components of an example machine for reading and executing instructions from a machine-readable medium, in accordance with some embodiments.

FIG. 4 is a block diagram illustrating components of an example machine for reading and executing instructions from a machine-readable medium. Specifically, FIG. 4 shows a diagrammatic representation of service provider system 120 and client device 100 in the example form of a computer system 400. The computer system 400 can be used to execute instructions (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 406. The computer system may include a storage device 408. The processor 402, memory 406, and the storage device 408 communicate via a bus 408.

In addition, the computer system 406 can include a memory 406, a graphics adaptor 412 to provide an interface for display 418. The computer system 400 may also include alphanumeric input device 410 (e.g., a keyboard), a pointing device 414 (e.g., a mouse, a trackball, a joystick, a motion sensor, or other pointing instrument), and a network adaptor 416, which also are configured to communicate via the bus 408. In one embodiment, the functionality of the processor 402 is provided by a memory controller hub 420 and an I/O controller hub 422.

The storage unit 416 includes a machine-readable medium, such as memory 406 on which is stored instructions (e.g., software) embodying any one or more of the methodologies or functions described herein. For example, the instructions may include the functionalities of modules of the systems described in FIG. 1. The instructions may also reside, completely or at least partially, within the memory 406 or within the processor 402 (e.g., within a processor's cache memory) during execution thereof by the computer system 400, the main memory 406 and the processor 402 also constituting machine-readable media. The instructions may be transmitted or received via the network adaptor 416.

While the memory 406 is shown in an example embodiment to be a single medium, the term "machine-readable medium" should be taken to include a single medium or multiple media (e.g., a centralized or distributed database, or associated caches and servers) able to store the instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
attempting to load, on a client device, a first application for execution on the client device, the first application being pre-configured to communicate with a provider for providing a service to a user of the client device;
determining that the first application has failed to load;
in response to determining that the first application has failed to load, loading, on the client device, a second application with a reference to the provider to provide the service, the reference being supplied by the first application to the second application and including an address of the provider, the second application comprising browser application functionality and not being pre-configured to provide the service;
retrieving, using the second application, from the provider, parameters for providing the service; and
providing the service, using the second application, based on the parameters.

2. The method of claim 1, wherein determining that the first application has failed to load comprises:
retrieving a plurality of checkpoints corresponding to the service;
determining whether the first application reached each checkpoint of the plurality of checkpoints during the attempting; and
in response to determining that the first application did not reach each checkpoint of the plurality of checkpoints during the attempting, determining that the first application has failed to load.

3. The method of claim 1, further comprising, further in response to determining that the first application has failed to load:
re-attempting to load the first application;
determining whether the first application has again failed to load;
in response to determining that the first application has not again failed to load, refraining from loading the second application; and
in response to determining that the first application has again failed to load, loading the second application.

4. The method of claim 3, wherein attempting to load the first application comprises attempting to load a plurality of modules of the first application, and wherein re-attempting to load the first application comprises:

iteratively re-loading the first application with, at each iteration, an additional module of the plurality of modules disabled;
determining, at each iteration, whether the re-launching has been performed a threshold number of times; and
in response to determining that the re-launching has been performed the threshold number of times, determining that the first application has again failed to load during the re-attempting.

5. The method of claim 1, wherein retrieving, using the second application, from the provider, the parameters comprises accessing the parameters using the address.

6. The method of claim 1, wherein providing the service, using the second application, based on the parameters comprises generating for display a user interface by the second application that is identical to a user interface typically provided by the first application.

7. The method of claim 6, further comprising:
receiving input from a user by way of the user interface;
retrieving, using the second application, additional information from the provider based on the input; and
altering a visual component of the user interface based on the additional information.

8. A non-transitory computer-readable storage medium storing executable computer program code that, when executed by one or more processors, cause the one or more processors to perform operations comprising:
attempting to load, on a client device, a first application for execution on the client device, the first application being pre-configured to communicate with a provider for providing a service to a user of the client device;
determining that the first application has failed to load;
in response to determining that the first application has failed to load, loading, on the client device, a second application with a reference to the provider to provide the service, the reference being supplied by the first application to the second application and including an address of the provider, the second application comprising browser application functionality and not being pre-configured to provide the service;
retrieving, using the second application, from the provider, parameters for providing the service; and
providing the service, using the second application, based on the parameters.

9. The non-transitory computer-readable storage medium of claim 8, wherein determining that the first application has failed to load comprises:
retrieving a plurality of checkpoints corresponding to the service;
determining whether the first application reached each checkpoint of the plurality of checkpoints during the attempting; and
in response to determining that the first application did not reach each checkpoint of the plurality of checkpoints during the attempting, determining that the first application has failed to load.

10. The non-transitory computer-readable storage medium of claim 8, wherein the operations further comprise, further in response to determining that the first application has failed to load:
re-attempting to load the first application;
determining whether the first application has again failed to load;
in response to determining that the first application has not again failed to load, refraining from loading the second application; and
in response to determining that the first application has again failed to load, loading the second application.

11. The non-transitory computer-readable storage medium of claim 10, wherein attempting to load the first application comprises attempting to load a plurality of modules of the first application, and wherein re-attempting to load the first application comprises:
iteratively re-loading the first application with, at each iteration, an additional module of the plurality of modules disabled;
determining, at each iteration, whether the re-launching has been performed a threshold number of times; and
in response to determining that the re-launching has been performed the threshold number of times, determining that the first application has again failed to load during the re-attempting.

12. The non-transitory computer-readable storage medium of claim 8, wherein retrieving, using the second application, from the provider, the parameters comprises accessing the parameters using the address.

13. The non-transitory computer-readable storage medium of claim 8, wherein providing the service, using the second application, based on the parameters comprises generating for display a user interface by the second application that is identical to a user interface typically provided by the first application.

14. The non-transitory computer-readable storage medium of claim 13, wherein the operations further comprise:
receiving input from a user by way of the user interface;
retrieving, using the second application, additional information from the provider based on the input; and
altering a visual component of the user interface based on the additional information.

15. A system comprising:
a processor configured to execute instructions; and
a non-transitory computer-readable medium having instructions executable by the processor to perform operations of:
attempting to load, on a client device, a first application for execution on the client device, the first application being pre-configured to communicate with a provider for providing a service to a user of the client device;
determining that the first application has failed to load;
in response to determining that the first application has failed to load, loading, on the client device, a second application with a reference to the provider to provide the service, the reference being supplied by the first application to the second application and including an address of the provider, the second application comprising browser application functionality and not being pre-configured to provide the service;
retrieving, using the second application, from the provider, parameters for providing the service; and
providing the service, using the second application, based on the parameters.

16. The system of claim 15, wherein the instructions to perform operations of determining that the first application has failed to load are further executable by the processor to perform operations of:
retrieving a plurality of checkpoints corresponding to the service;
determining whether the first application reached each checkpoint of the plurality of checkpoints during the attempting; and in response to determining that the first application did not reach each checkpoint of the plurality of checkpoints during the attempting, determining that the first application has failed to load.

17. The system of claim 15, wherein, the instructions are further executable by the processor to perform operations of, further in response to determining that the first application has failed to load:
re-attempting to load the first application;
determining whether the first application has again failed to load;
in response to determining that the first application has not again failed to load, refraining from loading the second application; and
in response to determining that the first application has again failed to load, loading the second application.

18. The system of claim 17, wherein attempting to load the first application comprises attempting to load a plurality of modules of the first application, and wherein re-attempting to load the first application comprises:

iteratively re-loading the first application with, at each iteration, an additional module of the plurality of modules disabled;
determining, at each iteration, whether the re-launching has been performed a threshold number of times; and
in response to determining that the re-launching has been performed the threshold number of times, determining that the first application has again failed to load during the re-attempting.

19. The system of claim 15, wherein retrieving, using the second application, from the provider, the parameters comprises accessing the parameters using the address.

20. The system of claim 15, wherein providing the service, using the second application, based on the parameters comprises generating for display a user interface by the second application that is identical to a user interface typically provided by the first application.

* * * * *